United States Patent
Nedachi

(10) Patent No.: US 7,860,472 B2
(45) Date of Patent: Dec. 28, 2010

(54) RECEIVER CIRCUIT AND RECEIVER CIRCUIT TESTING METHOD

(75) Inventor: Takaaki Nedachi, Tokyo (JP)

(73) Assignee: NEC Corporation, Tokyo (JP)

( * ) Notice: Subject to any disclaimer, the term of this patent is extended or adjusted under 35 U.S.C. 154(b) by 801 days.

(21) Appl. No.: 11/689,307

(22) Filed: Mar. 21, 2007

(65) Prior Publication Data

US 2007/0224958 A1 Sep. 27, 2007

(30) Foreign Application Priority Data

Mar. 24, 2006 (JP) .............................. 2006-081917

(51) Int. Cl.
*H04B 17/00* (2006.01)

(52) U.S. Cl. ................. 455/226.1; 455/67.14; 375/316; 375/354; 375/373; 375/375; 375/376; 327/147; 327/156

(58) Field of Classification Search ................. 375/316, 375/354, 373, 375, 376; 455/67.14, 226.1, 455/260; 327/147, 156
See application file for complete search history.

(56) References Cited

U.S. PATENT DOCUMENTS

| | | | |
|---|---|---|---|
| 7,092,689 B1 * | 8/2006 | Boecker et al. ............. | 455/260 |
| 7,251,764 B2 * | 7/2007 | Bonneau et al. ............. | 714/733 |
| 7,251,765 B2 * | 7/2007 | Kushiyama et al. ......... | 714/733 |
| 7,349,506 B2 * | 3/2008 | Shizuki ....................... | 375/350 |
| 2006/0192622 A1 * | 8/2006 | Narita .......................... | 331/16 |

FOREIGN PATENT DOCUMENTS

| | | |
|---|---|---|
| JP | 2003-337159 A | 11/2003 |
| JP | 2005-77274 A | 3/2005 |
| JP | 2005-257376 A | 9/2005 |

* cited by examiner

*Primary Examiner*—David C Payne
*Assistant Examiner*—Leon Flores
(74) *Attorney, Agent, or Firm*—Sughrue Mion, PLLC

(57) ABSTRACT

A delay means, in response to a delay control signal, performs delay control of the phase of a clock input signal, and outputs it. A selector means, during a speed test, selects a clock input signal from among a clock input signal from a delay unit, and the input signal from an external terminal. A conversion means samples the signal outputted from the selector means based on the sampling clock signal, converts a signal format and outputs it. A clock data recovery means generates a sampling clock signal having a phase depending on the signal inputted to the conversion means, and supplies it to the conversion means. By monitoring the control code for controlling the phase of the sampling clock, a correlation is obtained between a delay variation amount and a code variation amount, and a speed test is performed.

3 Claims, 5 Drawing Sheets

US 7,860,472 B2

RECEIVER CIRCUIT AND RECEIVER CIRCUIT TESTING METHOD

BACKGROUND OF THE INVENTION

Field of the Invention

The present invention relates to a receiver circuit used for a transceiver circuit or the like, and to a receiver circuit testing method.

INCORPORATION BY REFERENCE

This application is abased upon and claims the benefit of priority from Japanese patent application No. 2006-081917, filed on Mar. 24, 2006, the disclosure of which is incorporated herein in its entirety by reference.

DESCRIPTION OF THE RELATED ART

In the prior art, receiver circuits are used in transceivers for receiving signals.

Various methods have been developed to determine whether a receiver circuit satisfies predetermined specifications, such as speed tests (for example, JP 2003-337159A, JP 2005-77274A, JP 2005-257376A).

In a loop back test, which is performed as part of transceiver circuit tests, a driver circuit and a receiver circuit are connected via a transmission line such as a cable or a printed circuit outside a LSI (large-scale integrated circuit), or a driver circuit and the receiver circuit are connected directly inside a LSI. In the latter method, the efficiency of the LSI may be measured by a communication test with the LSI alone by a circuit tester unaffected by the transmission path by connecting the tester inside the LSI and performing the test at actual speed.

However, with increasing speeds and lower voltages, when interconnections which connect the driver circuit and receiver circuit inside the LSI are affected by ISI or when the driver circuit and receiver circuit are installed far from each other due to a multi-channel design, a problem arises in that sufficient waveform quality cannot be maintained. Although it is possible to perform a test up to about several Gbps by chopping between the driver circuit and receiver circuit via a buffer circuit, at higher speeds, problems such as surface area/Power become more significant.

SUMMARY OF THE INVENTION

It is therefore an object of the invention to provide a receiver circuit which permits a speed test to be performed without connection of a driver circuit.

It is a further object of the invention to provide a method of testing a receiver circuit which permits measurement of a receiver circuit speed without connection of a driver circuit.

For this purpose, the invention provides a receiver circuit including a delay means which in response to a delay control signal, delays the phase of a clock input signal and outputs it, a selector means which selects the clock input signal from the delay means or an input signal from an external terminal and outputs it, a conversion means which samples a signal outputted from the selector means based on a sampling clock signal, converts the signal format and outputs it, and a clock data recovery means which generates a sampling clock signal having a phase depending on the signal inputted to the conversion means from the selector means, and supplies it to the conversion means, wherein, during a speed test, the selector means selects a clock input signal from the delay means, and outputs it to the conversion means.

The invention further provides a selector means to which an input signal and a clock input signal from an external terminal are inputted, and which, during a speed test, selects the clock input signal, a conversion means which samples a signal outputted from the selector means based on the sampling clock signal, converts the signal format and outputs it, a clock data recovery means which functions based on a reference clock signal, generates a sampling clock signal having a phase according to the signal inputted to the conversion means from the selector means, and supplies it the conversion means, and first, second PLL means, wherein the phase of the reference clock signal of the second PLL means is made variable using the clock signal generated by the first PLL means as a reference clock signal of the clock data recovery means, and a clock signal generated by the second PLL means is used as a clock input signal to the selector means.

DETAILED DESCRIPTION OF THE EXEMPLARY EMBODIMENTS

Figure 1:
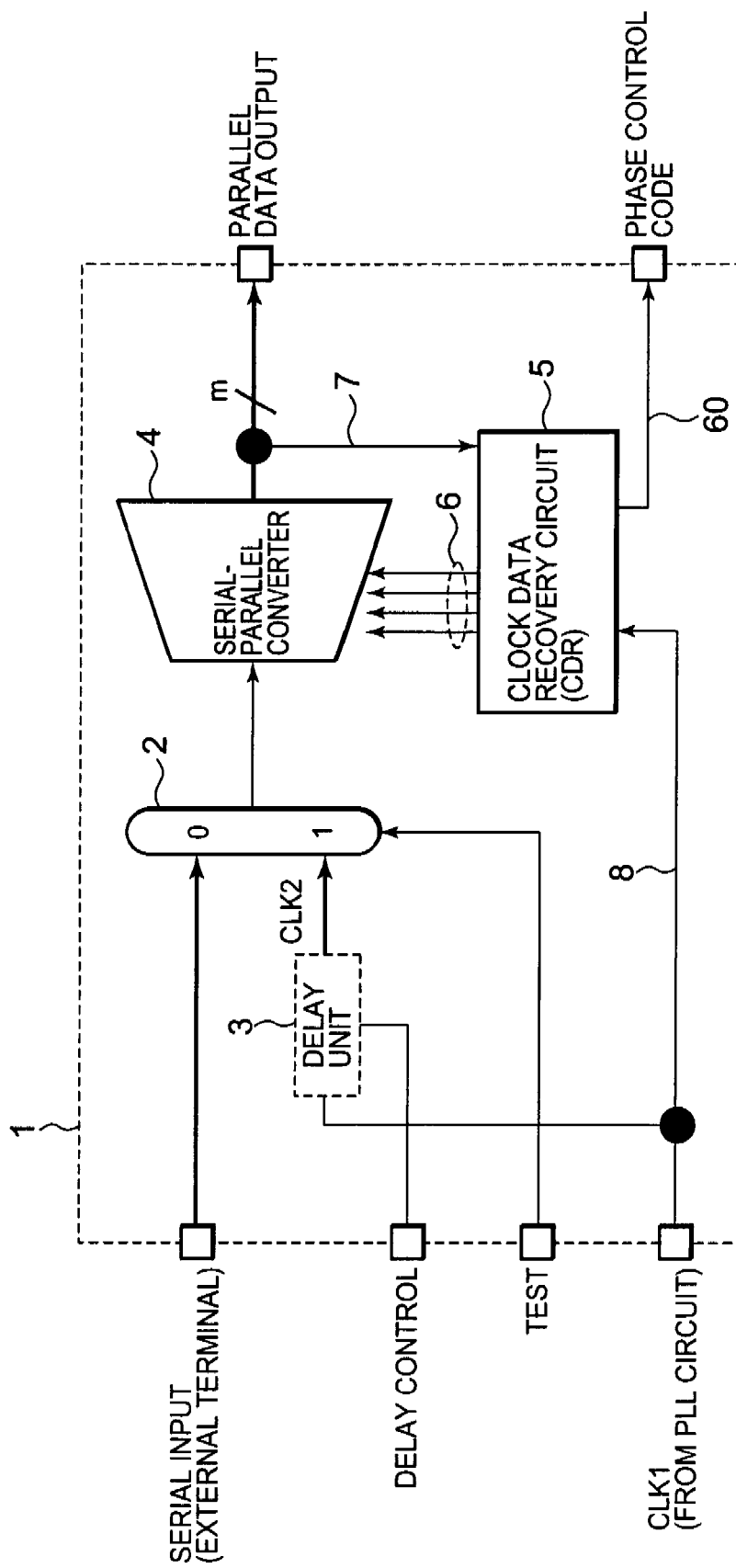
FIG. 1 is a block diagram of a receiver circuit used for a method of testing a receiver circuit relating to an embodiment of the invention.

FIG. 1 is a block diagram of a receiver circuit 1 in a transceiver circuit used for a test method of a receiver circuit related to one embodiment of the invention. FIG. 1 shows an example of a receiver circuit of a SerDes circuit (Serializer Deserializer: parallel-serial conversion and serial-parallel conversion circuit).

In FIG. 1, the receiver circuit 1 is provided with a selector circuit 2 which can be changed over, a delay unit 3, a serial-parallel (S/P) converter 4, and clock data recovery circuit (hereafter, referred to as a CDR circuit) 5 of an input path.

The selector circuit 2 has a first input unit to which a serial data signal is inputted from a serial input terminal which is an external terminal, and a second input unit to which a clock 2 signal (hereafter, CLK2 signal) is inputted from the delay unit 3. An input signal inputted to the first input unit or the second input unit is selected according to a test control signal supplied from a TEST terminal, and outputted.

The delay unit 3 delays the clock 1 signal (hereafter, CLK1 signal) supplied to the CLK1 terminal from a PLL (Phase Locked Loop) circuit, not shown, according to a delay control signal supplied to a delay control terminal, generates a CLK2 signal, and outputs it to the selector circuit 2. The CLK1 signal inputted into the delay unit 3 is inputted to the CDR circuit 5 as a reference clock signal 8 which is an operating reference.

Figure 2:
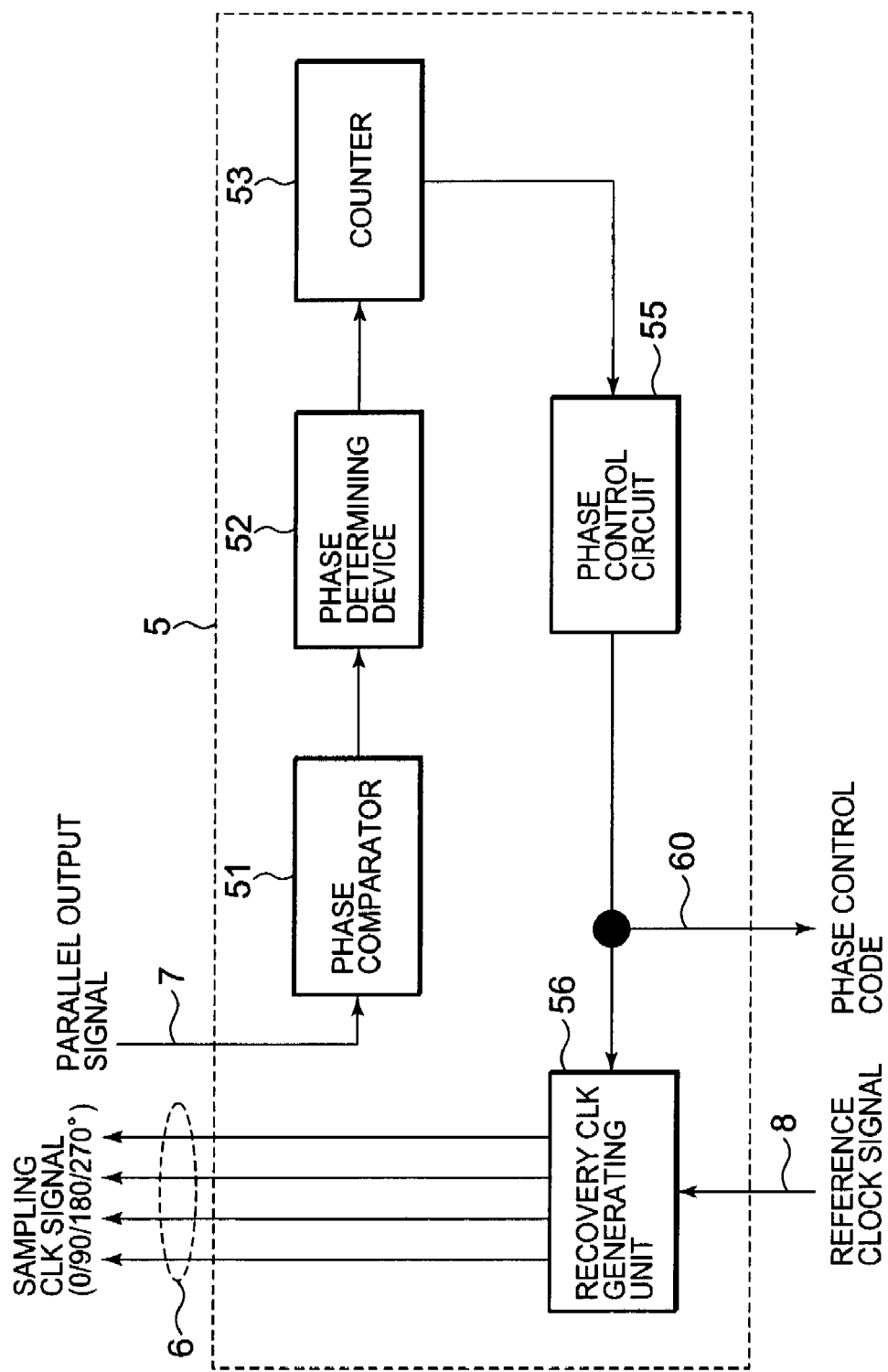
FIG. 2 is a detailed block diagram of components of the receiver circuit relating to the embodiment of the invention.

FIG. 2 is a block diagram showing the detailed construction of the CDR circuit 5 in FIG. 1. The same reference symbols as in FIG. 1 are used to denote corresponding or similar parts. In FIG. 2, the CDR circuit 5 is provided with a phase comparator 51, phase determining device 52, Up/Down counter 53, phase control circuit 55, and recovery clock (CLK) generation unit 56. The CDR circuit 5 outputs an optimal 4 phase sampling clock signal 6 to the S/P converter 4 according to the phase change of the inputted signal. The Clock 1 signal (CLK1 signal) from the PLL circuit is inputted to the recovery clock generating unit 56 as the reference clock signal 8 which is a clock signal used as an operating reference.

First, an outline of the receiver circuit and receiver circuit testing method relating to one embodiment of the invention will be described referring to FIGS. 1 and 2. In a test of the receiver circuit 1 of the invention, a speed test of an input buffer circuit and a CDR circuit are performed without connection of a driver circuit by using the input signal CLK1 signal distributed macroscopically as an input signal.

Specifically, in FIG. 1, it is assumed that the receiver circuit 1 can select two input signals, i.e., a serial data signal from a serial input terminal and the CLK1 signal. Delay (phase) control is performed with one input being ordinary serial data from an external terminal and the other input being the CLK1 signal. These two signal paths are changed over by the selector circuit 2. The CDR circuit 5 is a circuit which generates an optimal sampling clock relative to the inputted serial data signal. In the CLK generating unit (CLK generating unit 56 of FIG. 2), the 4 phase clock signal 6 which is synchronized with the CLK1 signal generated by the PLL circuit, is generated.

During a speed test, control is performed by supplying a test control signal to the TEST terminal so that the selector circuit 2 selects the CLK2 side. The delay amount of the CLK2 signal relative to the CLK1 signal is made to vary by controlling the delay unit 3 by a delay control signal. The timing of the input to the SP converter 4 is thereby varied. The CDR circuit 5 outputs the 4 phase clock signal 6 and phase control code 60 which follow the timing variation of this input. By monitoring the phase control code 60 outputted from the CDR circuit 5, the operation of the receiver circuit 1 can be verified.

Hence, in this embodiment, a speed test of the receiver circuit 1 can be performed without connecting a driver circuit by providing a new delay-controllable CLK signal path. In other words, apart from data input to the receiver circuit 1, the receiver circuit 1 can be tested by providing a path where the CLK1 signal which can be delay (phase)-controlled is taken as a data input, providing a mechanism for varying the delay amount, and monitoring the phase control code 60 generated by the CDR circuit 5.

Hereafter, the receiver circuit and receiver circuit test method according to the invention will be described in detail.

In FIG. 1, the selector circuit 2 selects one of two input signals, i.e., a serial data signal inputted to a serial input terminal, and the CLK2 signal. One is an ordinary external data signal inputted in serial form, and the other is the path of a CLK signal which can be delay-controlled (phase-controlled).

The delay unit 3 is configured to permit setting of plural delay times. The delay unit 3 is a delay circuit which permits a delay change of at least ±0.5 UI (1 UI=1 data width). The delay unit 3 generates the CLK2 signal which delays the CLK1 signal by a delay amount according to a delay control signal supplied to the delay control terminal.

The two signal paths inputted to the selector circuit 2 can be changed over by a test control signal inputted to the TEST terminal, and output. In the case of a test control signal=0 inputted to the TEST terminal, the input path is selected so that the serial data signal input to the serial input terminal is output from the selector circuit 2, and state being the receive mode. In the case of a test control signal=1 inputted to the TEST terminal, the input path is selected so that the CLK2 signal is output from the selector circuit 2, this state being the test mode.

The SP converter 4 converts high-speed serial data to m bits of parallel data (in this example, 4 bits), and outputs it. At the same time, the output signal after conversion is provided as data (information) for generating a sampling clock for the CDR circuit 5. The sampling clock is a 4 phase clock signal (CLK0, CLK90, CLK180, CLK270) produced in the CDR circuit 5, and shows the phase relation in FIG. 3.

Figure 3:
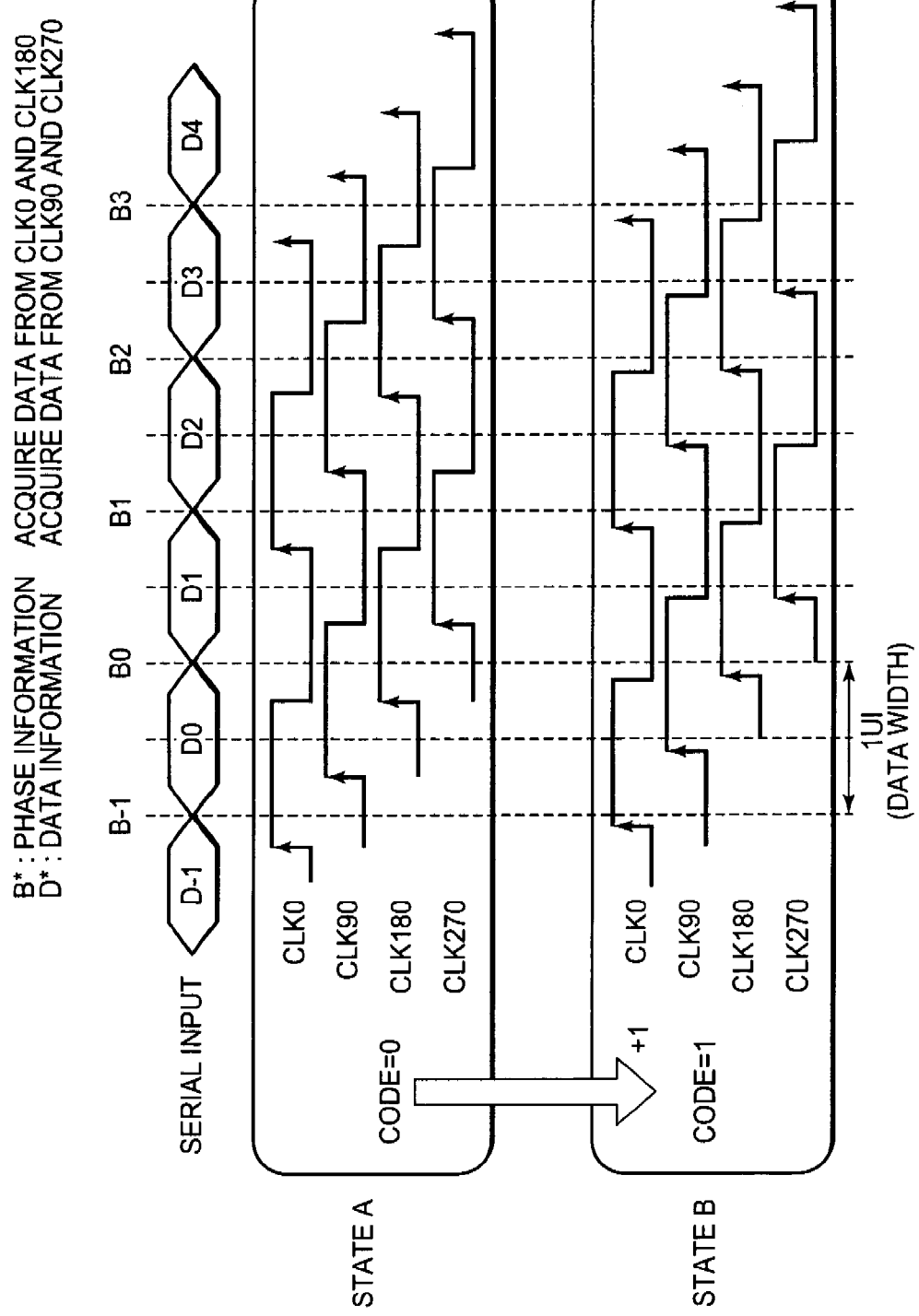
FIG. 3 is a timing chart for describing the operation of the embodiment of the invention.

In FIG. 3, CLK0 and CLK180 are CLK signals for obtaining phase information (B*(B-1) to B3) for serial data. CLK90 and CLK170 are CLK signals for obtaining receive data (D* (D-1) to D4) for serial data. Since parallel data obtained by the 4 phase CLK signal differs in CLK phase timing, timing adjustment thereof is performed by the same CLK signal by the SP converter 4, and their phases are thereby aligned. Here, use can be made of technology commonly known in the art, and since it is unrelated to the present invention, it will not be described.

The selector circuit 2 is a selector means, the delay unit 3 is a delay means, the SP conversion unit 4 is a conversion means, and the CDR circuit 5 is a clock data recovery means. The phase comparator 51 is a phase comparison means, the phase determining device 52 is a phase determining means, the up/down counter 53 is a counter means, the phase control circuit 55 is a phase control means, and the recovery clock generating unit 56 is a recovery clock generating means.

Figure 4:
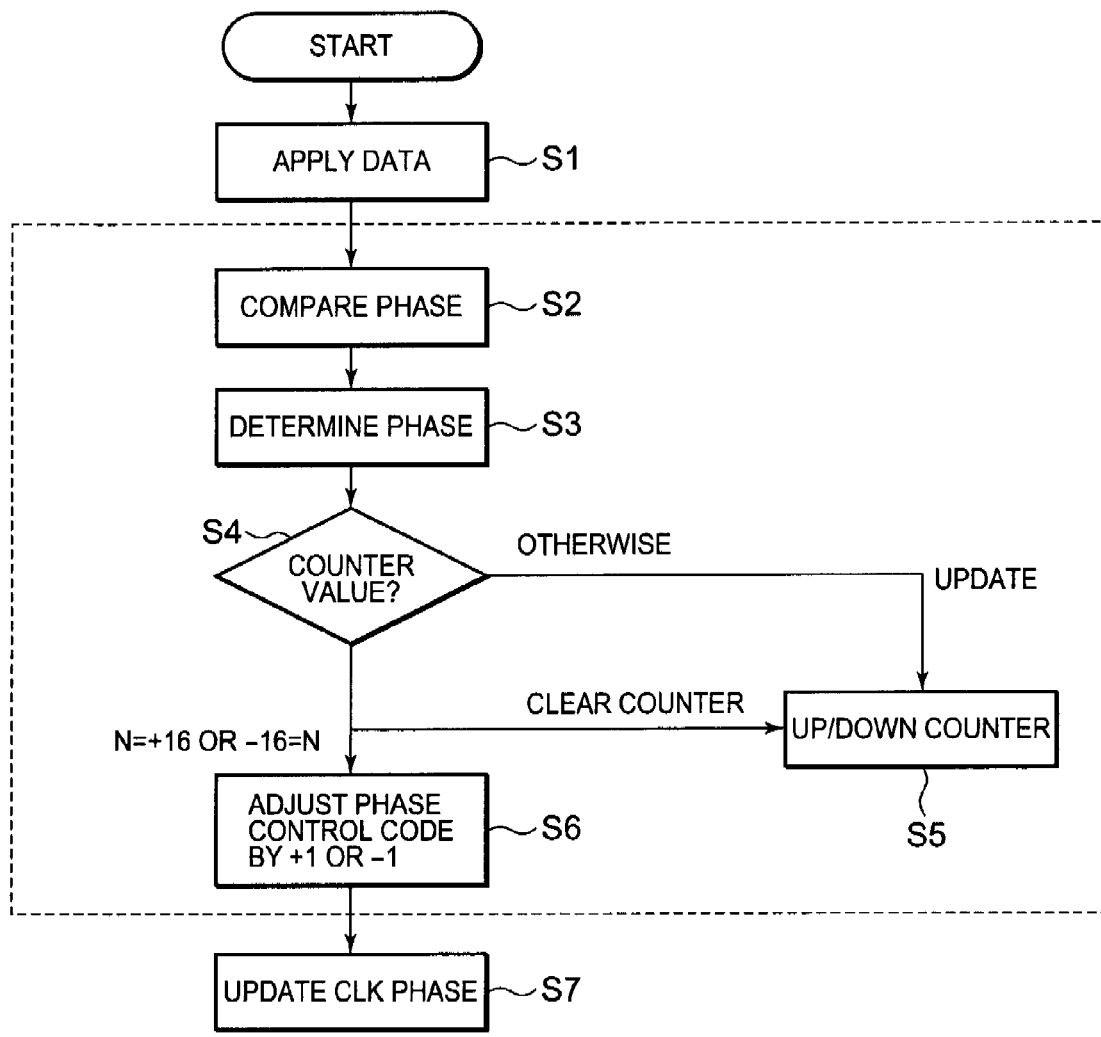
FIG. 4 is a flow chart which shows the operation of the embodiment of the invention.

FIG. 4 is a flow chart showing the operation of the CDR circuit 5.

Hereafter, the action of this embodiment will be described referring to FIGS. 1-4.

A signal outputted from the selector circuit 2 is applied to the SP converter 4 (Step S1 of FIG. 4). Four data, i.e., phase information generated by CLK0, CLK180, and data information generated by CLK90, CLK270, are outputted from the SP converter 4. The four data are inputted to the phase comparator 51 of the CDR circuit 5, and a phase comparison is performed (Step S2). The phase comparator 51, from the relation between phase information and data information, computes whether CLK0, CLK180 are advanced or delayed relative to the rising edge or falling edge of the data information, and the computation result is outputted.

In the phase determining device 52, a majority of computation results are determined, and it is determined whether to advance the phase (+: UP) or delay the phase (−: DOWN) (Step S3). The results are summed by the UP/DOWN counter 53, and when UP or DOWN reaches a fixed value (for example, 16 times), the Up/Down counter 53 is cleared (Step S5). If the fixed value is not reached, the routine returns to Step 2. The phase control circuit 55 generates a phase control code 60 as a phase control signal to advance (+: UP) or delay (−: DOWN) the phase of the 4 phase CLK signal (Step S6), and outputs it to the recovery CLK generating unit 56.

In the example of FIG. 3, when the phase control code 60 is 0, since the timing of CLK0-CLK270 is early relative to the timing of serial data, a signal (−: DOWN) with delayed phase is outputted. If this DOWN is counted 16 times by the UP/DOWN counter, the UP/DOWN counter is cleared to 0, and a command to change the phase control code 60 to +1 is outputted to the phase control circuit 55.

The phase control circuit 55 updates the control code 60 from the state where the phase control code 60 is 0 to the state where the phase control code 60 is 1, and the 4 phase clock signal phase state is updated from A to B in FIG. 3 (Step S7). The CLK generation unit 56 always provides the optimal CLK signal for receive data by changing over the timing of the sampling CLK according to the phase control code 60. The phase control code 60 is controlled in, for example, 64 steps (code 0-code 63), and the variation amount of the phase per 1code is 1step=1 UI/64.

During a test, by inputting a test control signal to the TEST terminal, control is performed so that the selector circuit 2 selects the path on the input unit 1 side. Even if the CLK signal 2 is input instead of serial data, the phase tracking function of the CDR circuit 5 does not change. The CDR circuit 5 generates the phase control code 60 tracking this phase by making the phase of the CLK2 signal vary arbitrarily by the delay unit 3. By monitoring this phase control code information 60, a correlation is obtained between a delay variation amount and a code variation amount. Hence, according to this embodiment, a speed test of receiver circuit 1 can be performed without connecting a driver circuit by newly providing a path for the delay-controllable CLK signal.

As stated above, according to this embodiment, in response to the delay control signal, the delay unit 3 performs delay control of the phase of the clock input signal, and when the selector 2 performs a speed test, it selects one of the clock input signal from the delay unit and the input signal from the external terminal, and outputs it, the serial-parallel converter 4 samples the signal outputted from the selector 2 based on the sampling clock signal, converts the serial signal to a parallel signal and outputs it, the clock data recovery circuit 5 generates the sampling clock signal having an optimal phase according to an output signal 7 of the converter 4, and supplies it to the serial-parallel converter 4, and by monitoring the phase control code 60 for controlling the phase of this sampling clock, a correlation is obtained between the delay variation amount and code variation amount, and a speed test is performed.

A speed test of the receiver circuit 1 can thus be performed without connecting a driver circuit. Since the CLK signal distributed in the receiver circuit 1 is taken as the input source, the connection with the input buffer can be made the shortest, and influence of wave deterioration can be minimized.

By varying the delay of the path having the CLK signal as input, the tracking properties of the CDR circuit 5 can easily be verified.

Figure 5:
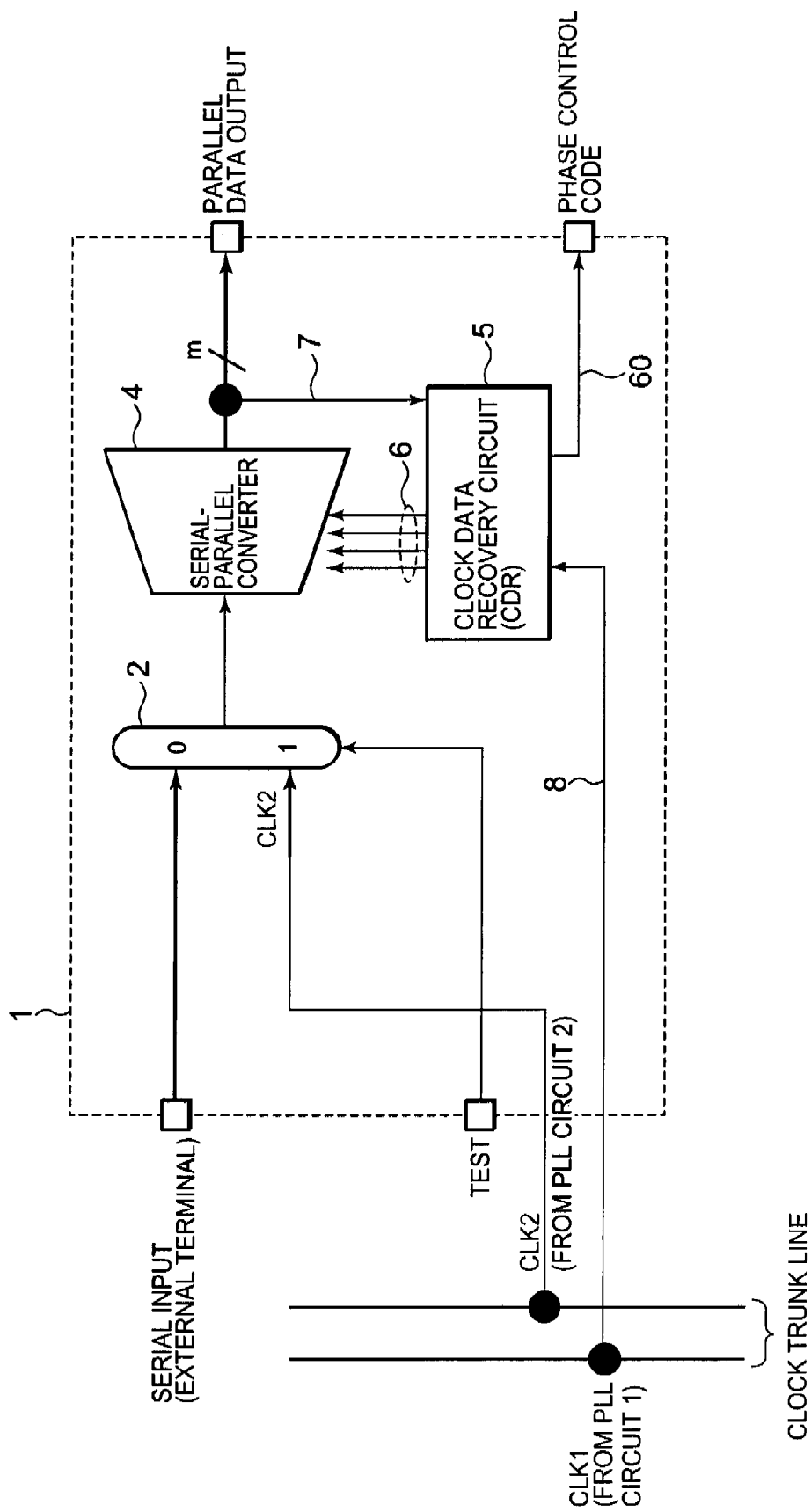
FIG. 5 is a block diagram of a receiver circuit relating to another embodiment of the invention.

FIG. 5 is a block diagram showing a receiver circuit used for a method of testing a receiver circuit relating to another embodiment of the invention.

The same reference symbols as in FIG. 1 are used to denote corresponding or similar parts. The basic construction of this embodiment is identical to that of the embodiment mentioned above, but the input data unit is different.

Specifically, in FIG. 5, a CLK signal from a different CLK signal distribution system (the second PLL circuit) which is different from the first PLL circuit which generates the clock signal 1 of the CDR circuit 5, is supplied to the second input unit of the selector circuit 2. Since the basic operation is identical to that of the receiver circuit 1 of FIG. 1, a detailed description is omitted. In this embodiment, the phase of a reference CLK signal of the second PLL circuit is varied without having a delay control mechanism (the delay unit 3 of FIG. 1, the delay control terminal and a means to supply a delay control signal to the delay unit 3). Hence, the phase of the CLK2 signal can be controlled, an equivalent function to that of the embodiment can be realized, and a speed test can be performed in an identical manner.

In the above embodiments, an example of a receiver circuit for a transceiver was described, but it is applicable also to a receiver circuit for other devices.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A receiver circuit, comprising:
conversion circuit for converting a format of a signal with sampling said signal based on a sampling clock signal;
clock data recovery circuit for generating said sampling clock signal having a phase depending on said signal inputted to said conversion circuit;
delay circuit for performing delay control to a phase of a clock input signal according to a delay control signal;
selector for selecting, during a speed test, said clock input signal delayed by said delay circuit to input to said conversion circuit;
wherein said conversion circuit outputs a plurality of output signal, and said clock data recovery circuit comprises:
phase control circuit which compares said plurality of output signal, and outputs a phase control code for controlling said phase of said sampling clock signal based on a comparison result of said plurality of output signal;
recovery clock generating circuit which generates said sampling clock signal having a phase depending on said phase control code, and outputs it to said conversion circuit; and
counter which counts phase advances or delays according to said comparison result, wherein, when said counter counts a predetermined number, said phase control code is varied by a predetermined amount and a counter value of said counter is reset.

2. A receiver circuit, comprising:
conversion means for converting a format of a signal with sampling said signal based on a sampling clock signal;
clock data recovery means for generating said sampling clock signal having a phase depending on said signal inputted to said conversion means;
delay means for performing delay control to a phase of a clock input signal according to a delay control signal;
selector means for selecting, during a speed test, said clock input signal delayed by said delay means to input to said conversion means,
wherein said conversion means outputs a plurality of output signal, and said clock data recovery means comprises:
phase control means which compares said plurality of output signal, and outputs a phase control code for controlling said phase of said sampling clock signal based on a comparison result of said plurality of output signal;
recovery clock generating means which generates said sampling clock signal having a phase depending on said phase control code, and outputs it to said conversion means; and
counter means which counts phase advances or delays according to said comparison result, wherein, when said counter means counts a predetermined number, said phase control code is varied by a predetermined amount and a counter value of said counter means is reset.

3. A receiver circuit test method, comprising:
converting a format of a signal with sampling said signal based on a sampling clock signal;
generating said sampling clock signal having a phase according to said signal;
performing delay control to a phase of a clock input signal according to a delay control signal;

selecting, during a speed test, said clock input signal delayed according to said delay control signal as said signal for said converting,
wherein said converting comprises outputting a plurality of output signal, and said generating said sampling clock signal comprises:
comparing said plurality of output signal;
outputting a phase control code for controlling said phase of said sampling clock signal based on a comparison result of said plurality of output signal;

generating said sampling clock signal having a phase depending on said phase control code;
counting phase advances or delays according to said comparison result; and
varying said phase control code by a predetermined amount and resetting a counter value when counting a predetermined number.

* * * * *